(12) United States Patent
Yamaji et al.

(10) Patent No.: US 9,199,601 B2
(45) Date of Patent: Dec. 1, 2015

(54) AIRBAG DEVICE

(71) Applicant: ASHIMORI INDUSTRY CO., LTD., Osaka-shi, Osaka (JP)

(72) Inventors: Naoki Yamaji, Settsu (JP); Kazuto Tokura, Settsu (JP)

(73) Assignee: ASHIMORI INDUSTRY CO., LTD., Osaka (JP)

( * ) Notice: Subject to any disclaimer, the term of this patent is extended or adjusted under 35 U.S.C. 154(b) by 0 days.

(21) Appl. No.: 14/350,637

(22) PCT Filed: Oct. 18, 2012

(86) PCT No.: PCT/JP2012/076978
§ 371 (c)(1),
(2) Date: Apr. 9, 2014

(87) PCT Pub. No.: WO2013/058329
PCT Pub. Date: Apr. 25, 2013

(65) Prior Publication Data
US 2014/0284905 A1    Sep. 25, 2014

(30) Foreign Application Priority Data
Oct. 20, 2011 (JP) .................. 2011-230645

(51) Int. Cl.
*B60R 21/2334* (2011.01)
*B60R 21/239* (2006.01)
(Continued)

(52) U.S. Cl.
CPC ........... *B60R 21/2334* (2013.01); *B60R 21/203* (2013.01); *B60R 21/233* (2013.01); *B60R 21/239* (2013.01); *B60R 21/2346* (2013.01); *B60R 2021/161* (2013.01); *B60R 2021/23332* (2013.01); *B60R 2021/23382* (2013.01)

(58) Field of Classification Search
USPC .................. 280/729, 731, 734, 736
See application file for complete search history.

(56) References Cited

U.S. PATENT DOCUMENTS 5,249,824 A * 10/1993 Swann et al. ................ 280/729
6,213,496 B1 * 4/2001 Minami et al. ............... 280/729
(Continued)

FOREIGN PATENT DOCUMENTS

| JP | 1-311930 A | 12/1989 |
|---|---|---|
| JP | 11-321506 A | 11/1999 |

(Continued)

OTHER PUBLICATIONS

International Search Report for PCT/JP2012/076978 dated Jan. 15, 2013.

*Primary Examiner* — Ruth Ilan
*Assistant Examiner* — Darlene P Condra
(74) *Attorney, Agent, or Firm* — Sughrue Mion, PLLC

(57) ABSTRACT

When an inner bag is inflated inside an outer bag, impact on an occupant received by an airbag is reduced. An inner bag (30) is inflated with gas supplied from an inflator (3). A gas exhaust port (31) is formed on the inner bag (30) and allows the gas to flow from the inner bag (30) in an occupant direction (E). An outer bag (20) accommodates the inner bag (30) and is inflated with the gas supplied from the gas exhaust port (31). A restriction member restricts the inflation of a portion of the inner bag (30) to change a direction of which the gas flows out from the gas exhaust port (31) to avoid the occupant direction. The restriction member breaks during the inflation of the outer bag (20) to release the restriction of the inflation of the inner bag (30).

5 Claims, 10 Drawing Sheets

(51) Int. Cl.
*B60R 21/233* (2006.01)
*B60R 21/203* (2006.01)
*B60R 21/2346* (2011.01)
*B60R 21/2338* (2011.01)
*B60R 21/16* (2006.01)

(56) References Cited

U.S. PATENT DOCUMENTS

| | | | |
|---|---|---|---|
| 6,247,727 B1 * | 6/2001 | Hamada et al. | 280/743.2 |
| 6,398,258 B2 * | 6/2002 | Hamada et al. | 280/743.1 |
| 6,962,363 B2 * | 11/2005 | Wang et al. | 280/729 |
| 2006/0131846 A1 * | 6/2006 | Abe | 280/729 |
| 2006/0249943 A1 * | 11/2006 | Bauer et al. | 280/743.2 |
| 2008/0303256 A1 * | 12/2008 | Williams | 280/742 |
| 2009/0212538 A1 * | 8/2009 | Abe et al. | 280/729 |
| 2010/0225094 A1 * | 9/2010 | Rose et al. | 280/729 |
| 2013/0093168 A1 * | 4/2013 | Przybysz et al. | 280/729 |
| 2013/0313809 A1 * | 11/2013 | Yamaji | 280/729 |

FOREIGN PATENT DOCUMENTS

| | | |
|---|---|---|
| JP | 2004-148858 A | 5/2004 |
| JP | 2006-199269 A | 8/2006 |
| JP | 2006-312451 A | 11/2006 |
| JP | 2010-254081 A | 11/2010 |
| WO | 97/47497 A1 | 12/1997 |

* cited by examiner

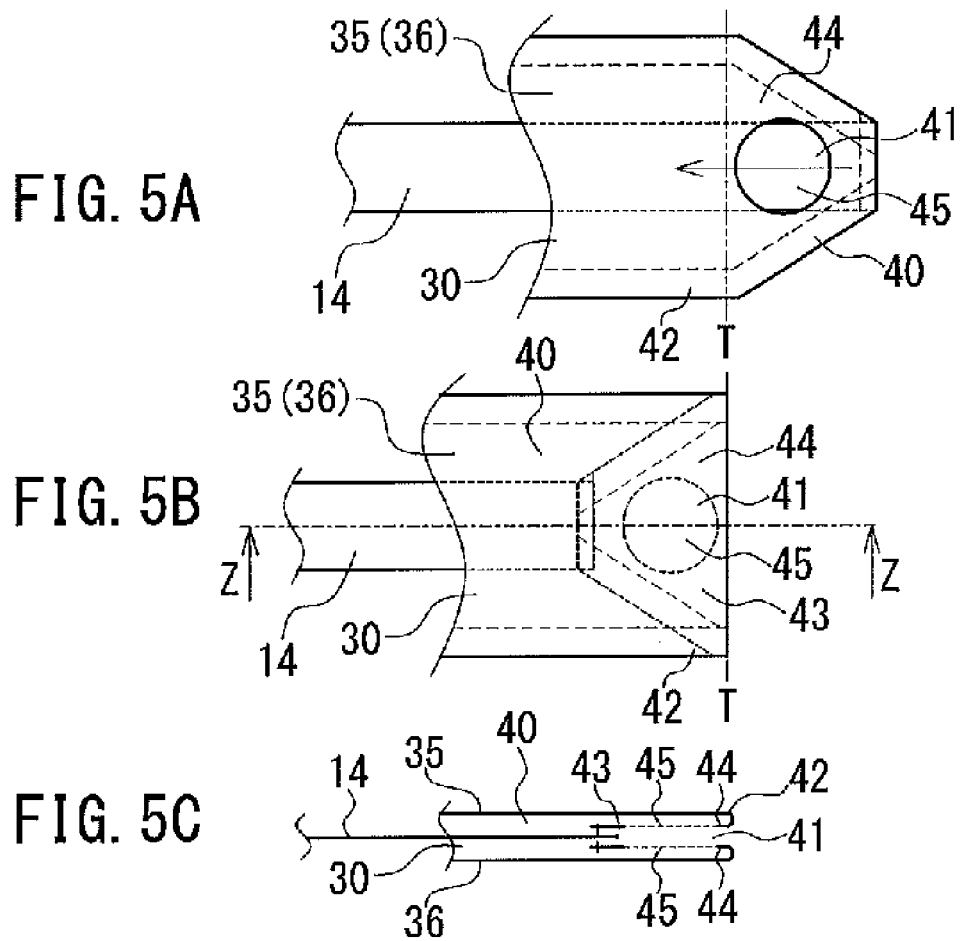
FIG. 5A
FIG. 5B
FIG. 5C
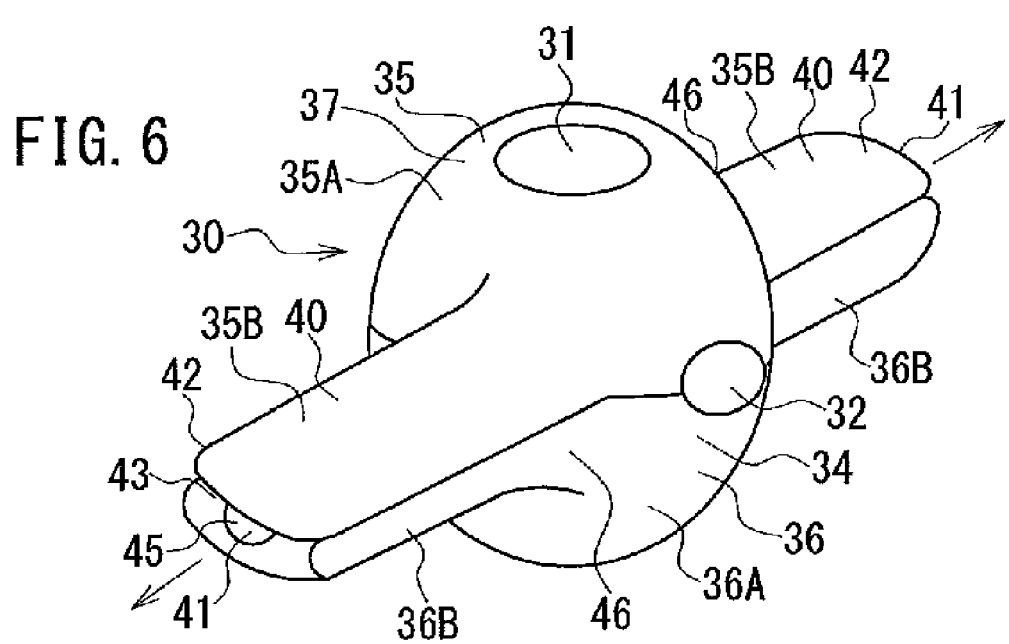
FIG. 6

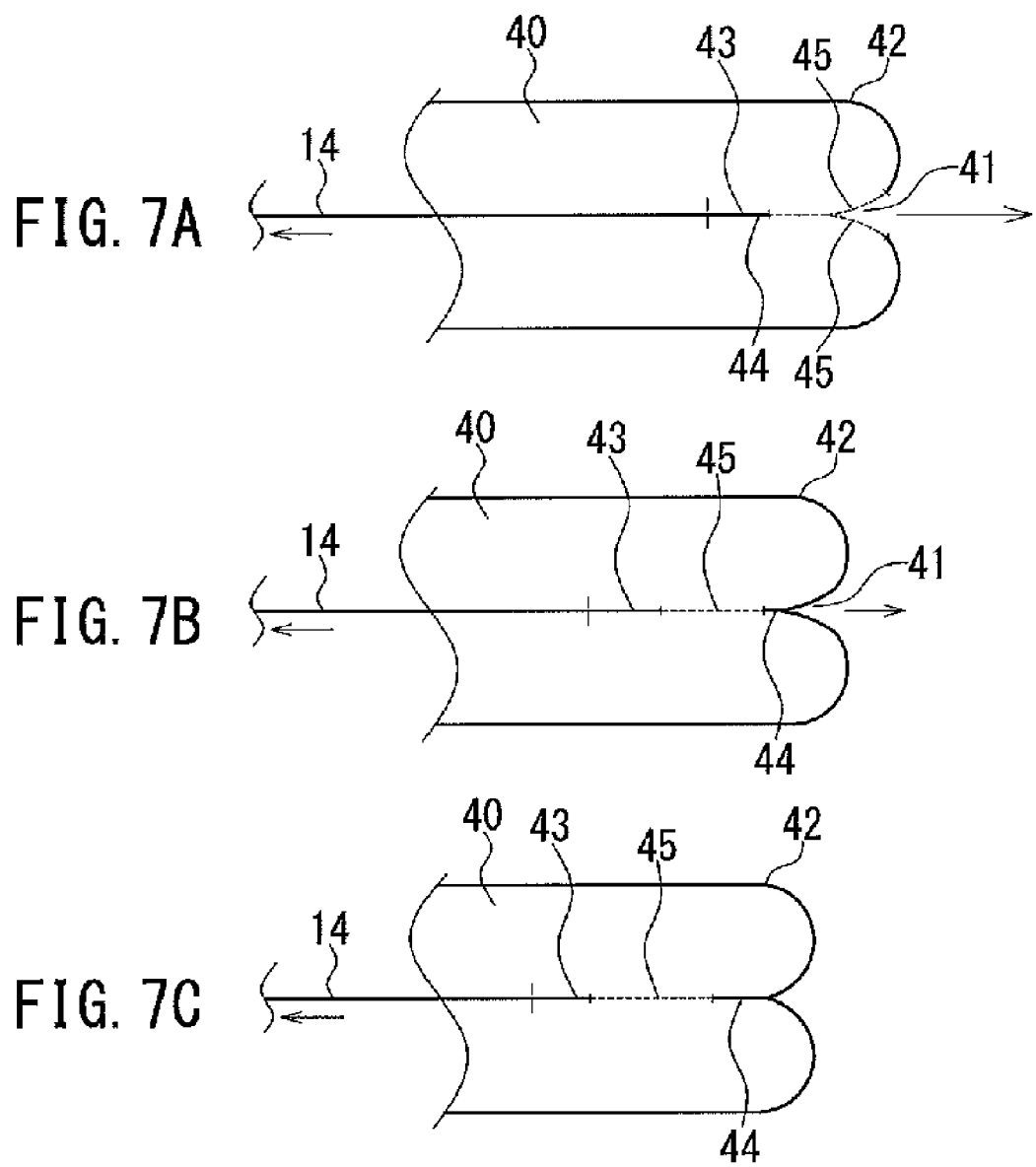

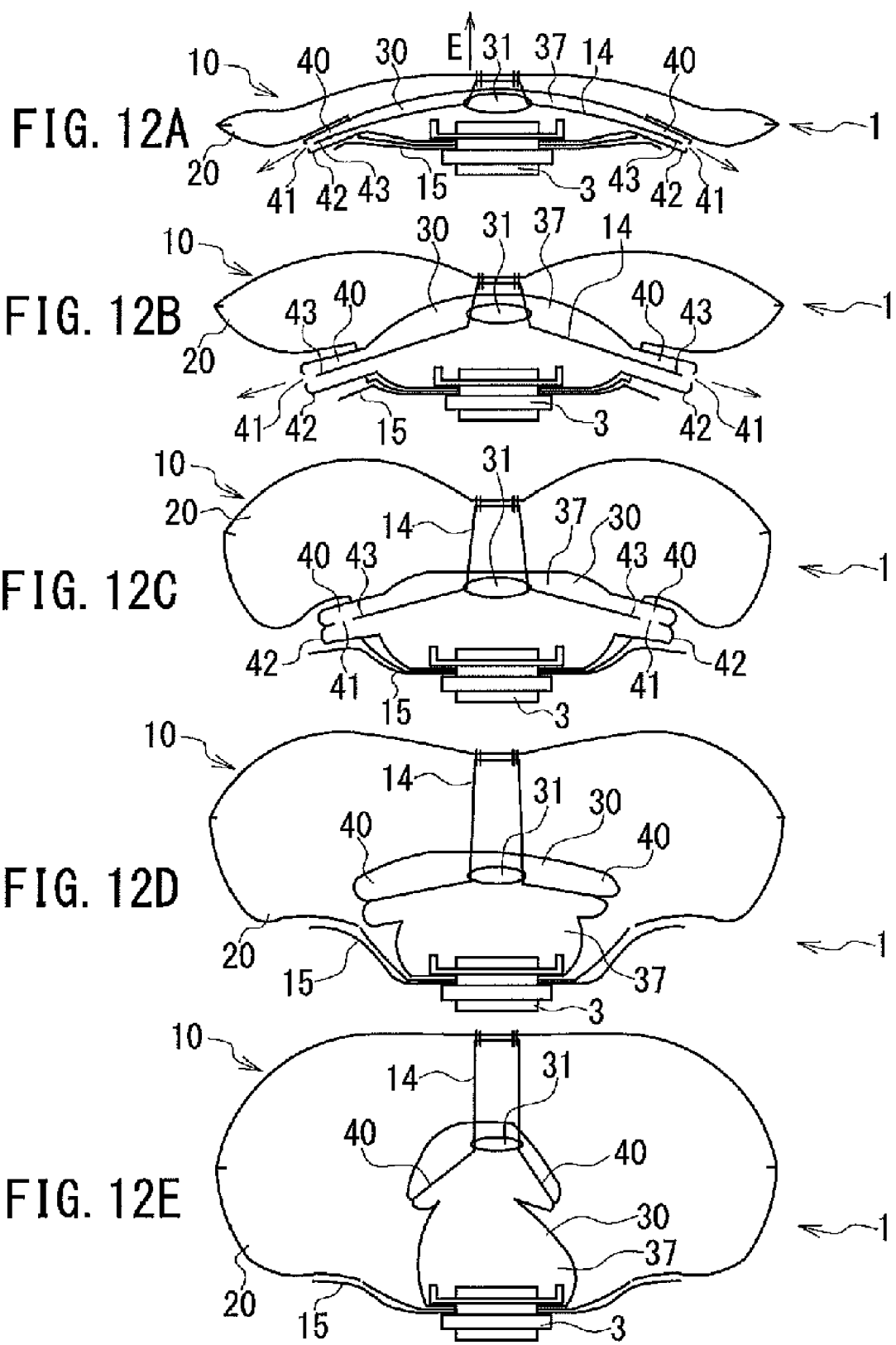

AIRBAG DEVICE

CROSS REFERENCE TO RELATED APPLICATIONS

This application is a National Stage of International Application No. PCT/JP2012/076978 filed Oct. 18, 2012, claiming priority based on Japanese Patent Application No. 2011-230645 filed Oct. 20, 2011, the contents of all of which are incorporated herein by reference in their entirety.

TECHNICAL FIELD

The present invention relates to an airbag device installed in a vehicle, such as a car, to protect an occupant.

BACKGROUND ART

In order to protect occupants in an emergency or in a collision of a vehicle, airbag devices for a driver's seat and a passenger's seat are used. An airbag device inflates and deploys an airbag in front of an occupant, and the occupant is received and restrained by the airbag. Furthermore, conventionally, an airbag device having a double-walled airbag, which includes an outer bag and an inner bag, is known (see PTL 1).

In the conventional airbag device, the inner bag is inflated with gas supplied from an inflator. The gas flows into the outer bag through a circulation port in the inner bag, inflating the outer bag around the inner bag. An occupant is received by the inflated outer bag.

Such a double-walled airbag may allow the gas to flow from the inner bag toward the occupant, depending on the properties and deployment behavior required for the airbag. The inner bag is inflated inside the outer bag while allowing the gas to flow toward the occupant. At this time, if the occupant is in close vicinity of the airbag device, the occupant is received by the airbag that has not yet been fully inflated. In such a case, the occupant may collide with the inflating inner bag and receive impact. Furthermore, the impact applied to the occupant may increase due to the gas flowing toward the occupant from the inner bag. Therefore, such an airbag device has room for improvement, from the standpoint of suppressing damage to the occupant.

CITATION LIST

Patent Literature

PTL 1: Japanese Unexamined Patent Application, Publication No. 2004-148858

SUMMARY OF INVENTION

Technical Problem

The present invention has been made in view of the above-described problems existing in the conventional airbag devices, and an object thereof is to reduce the impact on an occupant received by an airbag and suppress damage to the occupant when an inner bag is inflated inside an outer bag.

Solution to Problem

The present invention is an airbag device for protecting an occupant of a vehicle, the airbag device including an inflator that supplies gas; an inner bag that is inflated with the gas supplied from the inflator; a gas exhaust port that is formed on the inner bag and allows the gas to flow out from the inner bag in an occupant direction; an outer bag that accommodates the inner bag and is inflated with the gas supplied from the gas exhaust port; and a restriction member that restricts the inflation of a portion of the inner bag to change a direction of which the gas flows out from the gas exhaust port to avoid the occupant direction and that breaks during the inflation of the outer bag to release the restriction of the inflation of the inner bag.

Advantageous Effects of Invention

According to the present invention, it is possible to reduce the impact on an occupant received by an airbag when an inner bag is inflated inside an outer bag. Furthermore, it is possible to suppress damage to the occupant.

BRIEF DESCRIPTION OF DRAWINGS

FIG. 5 includes enlarged views of a portion Y of the inner bag shown in FIG. 4.
FIG. 6 is a perspective view of the inner bag after inflation.
FIG. 7 includes cross-sectional views showing a distal end of a discharge tube.
FIG. 12 includes cross-sectional views showing, in stages, the inflation and deployment of the airbag.

DESCRIPTION OF EMBODIMENTS

An embodiment of an airbag device of the present invention will be described below with reference to the drawings.

The airbag device according to this embodiment is installed in a vehicle and protects an occupant of a vehicle by receiving the occupant with an inflated and deployed airbag. More specifically, the airbag device is provided in the vicinity of a seat, such as a driver's seat or a passenger's seat, in a vehicle and protects the occupant. The airbag device of the present invention will be described below, taking a driver's seat airbag device installed in the steering wheel as an example.

Figure 1:
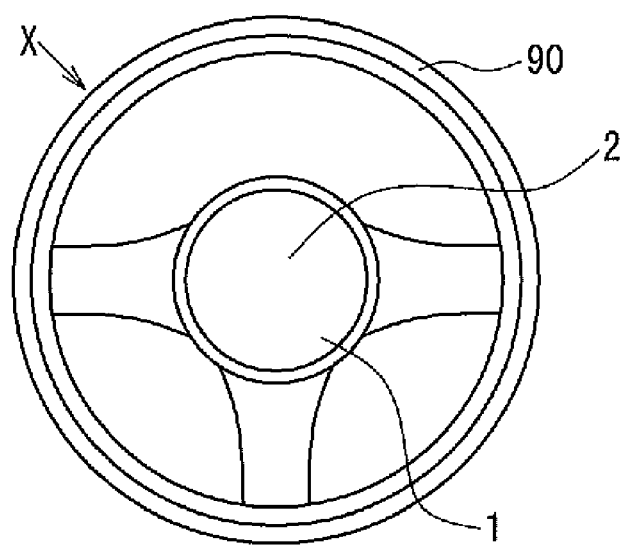
FIG. 1 is a front view showing a steering wheel provided with an airbag device.

FIG. 1 is a front view of a steering wheel provided with an airbag device, showing a steering wheel 90, as viewed from the occupant side.

The steering wheel 90 is disposed in front of the driver's seat. As shown in the figure, an airbag device 1 is installed in the center of the steering wheel 90 and is disposed in front of the occupant. The airbag device 1 includes an airbag cover 2 that covers the front surface of the airbag device 1 and an airbag (not shown) disposed inside the airbag cover 2.

The airbag is stored in the airbag cover 2 in a folded state. When inflated, the airbag push-opens the airbag cover 2 and deploys so as to cover the steering wheel 90, inside the vehicle cabin. The airbag is inflated to the sides and in a direction in which the occupant is located (occupant direction), between the steering wheel 90 and the occupant.

Figure 2:
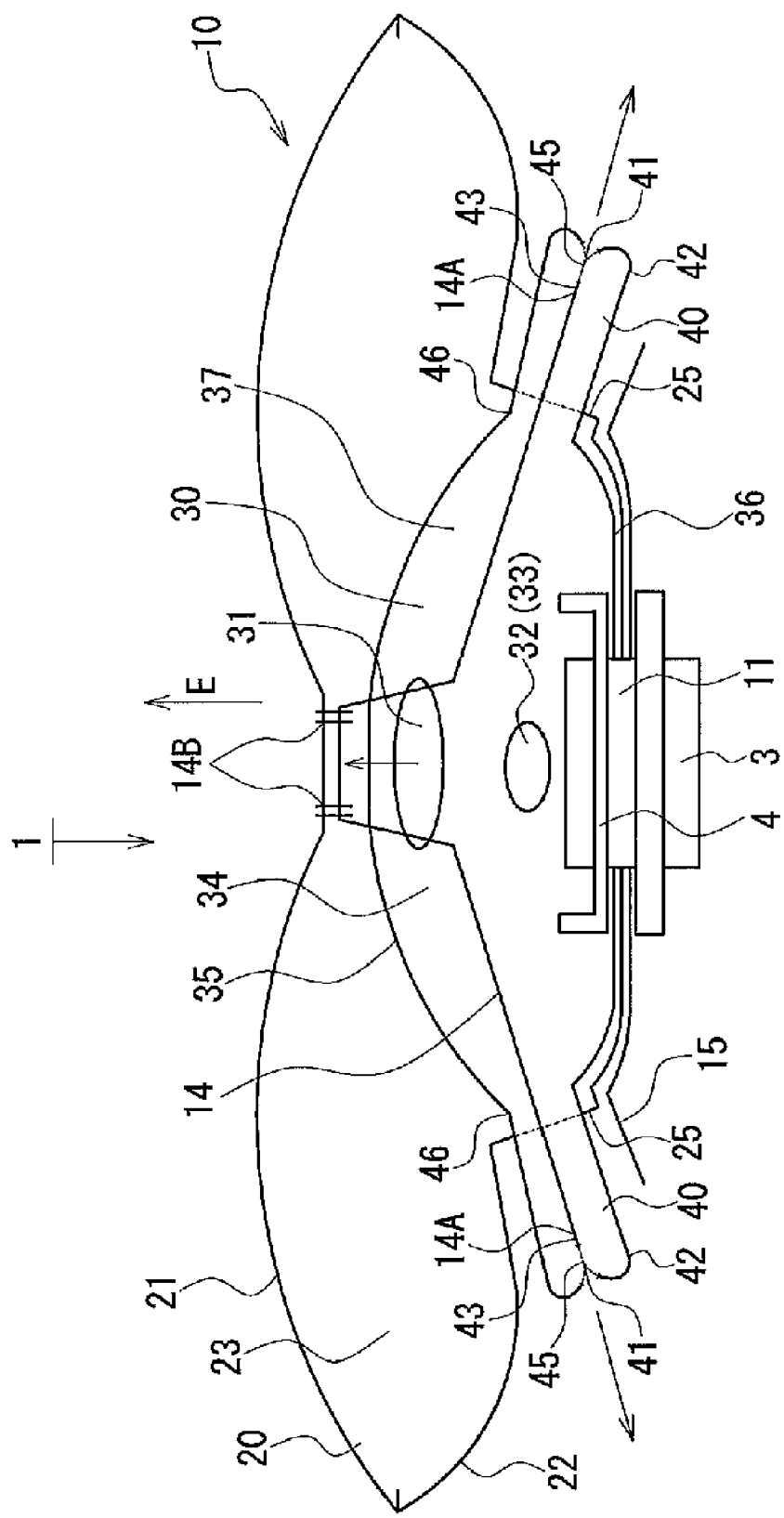
FIG. 2 is a diagram showing an airbag device according to this embodiment.
Figure 3:
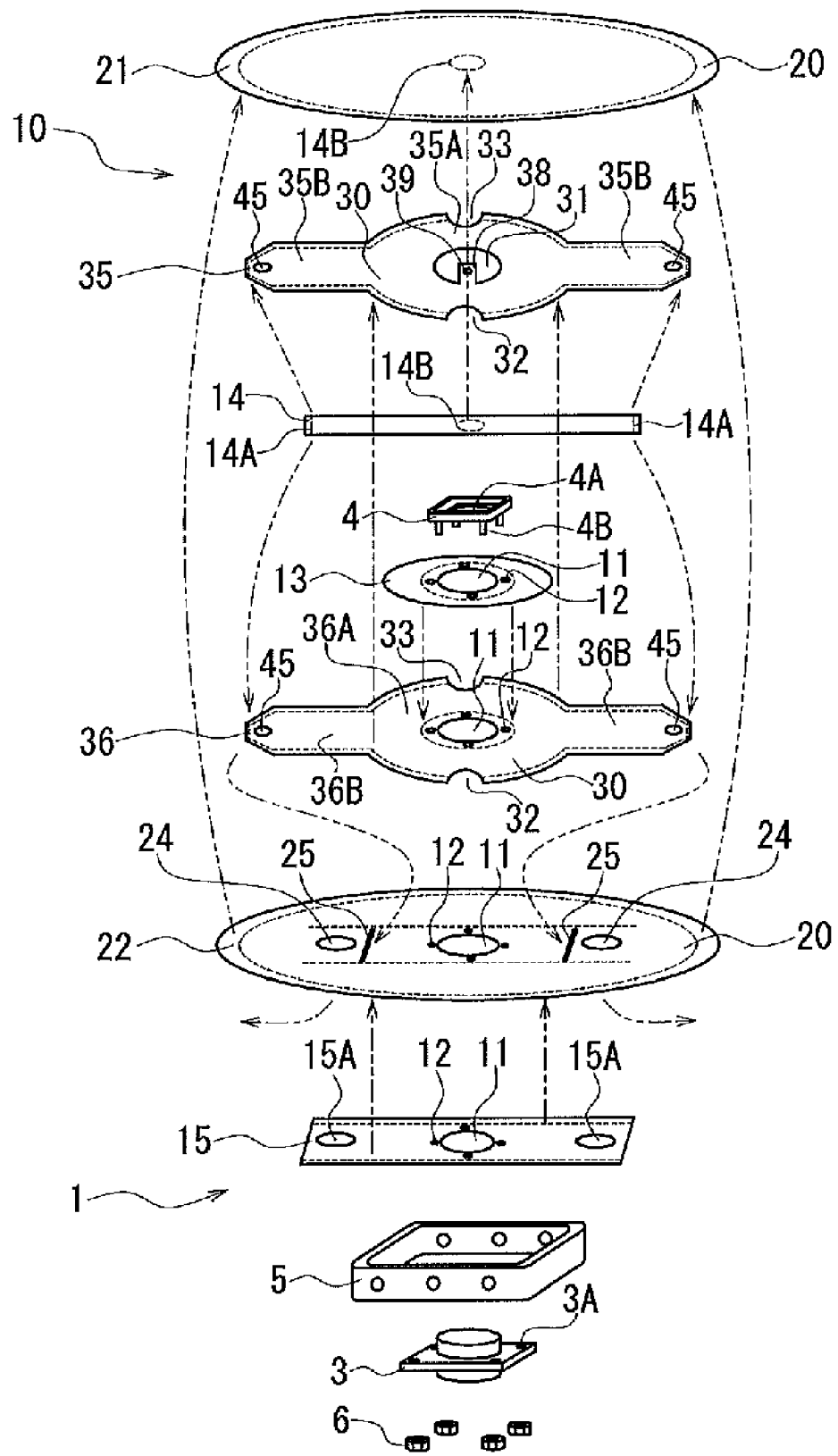
FIG. 3 is an exploded perspective view of the airbag device according to this embodiment.

FIG. 2 is a diagram showing the airbag device 1 according to this embodiment and is a cross-sectional view schematically showing an airbag 10 that is in the middle of deployment (inflation), when the airbag device 1 is viewed in the direction indicated by an arrow X in FIG. 1. FIG. 3 is a perspective view showing the airbag device 1 in an exploded manner, in which the respective parts of the airbag device 1 are separated away from one another in the top-bottom direction. FIG. 3 also shows, with arrows, the relationship between members to be assembled and the positions where these members are assembled.

As shown in the figure, the airbag device 1 includes the inflatable and deployable airbag 10, an inflator 3, a cushion ring 4 disposed inside the airbag 10, and a reaction plate 5 (not shown in FIG. 2). The airbag 10 is inflated and deployed toward the occupant with the gas supplied from the inflator 3.

The inflator 3 is a disk-type gas generator and has a plurality of gas discharge ports (not shown) in the outer periphery at one end in the thickness direction. The one end of the inflator 3 is inserted into the airbag 10 from an attaching opening 11 provided in the airbag 10. In this state, the inflator 3 is attached to the attaching opening 11. In an emergency of the vehicle or upon detection of an impact, the inflator 3 generates gas inside the airbag 10 by radially jetting the gas from the plurality of gas discharge ports, thereby inflating and deploying the airbag 10, from a predetermined folded shape, with the gas supplied thereto.

The cushion ring 4 is formed in a rectangular shape and is provided with, at the center thereof, a hole 4A (see FIG. 3), into which the inflator 3 is inserted. Furthermore, four bolts 4B are fixed around the hole 4A in the cushion ring 4. The cushion ring 4 fixes the airbag 10 to the reaction plate 5. At this time, a portion around the attaching opening 11 in the airbag 10 is sandwiched between the cushion ring 4 and the reaction plate 5.

When the airbag 10 is to be fixed, first, the bolts 4B of the cushion ring 4 are inserted into insertion holes 12 provided in the respective members of the airbag 10 to temporarily join the respective members of the airbag 10 together. After the bolts 4B are inserted into attaching holes (not shown) in the reaction plate 5, the inflator 3 is attached to the reaction plate 5. The bolts 4B serve as attaching members for attaching the inflator 3 to the airbag 10 and are inserted into the insertion holes 3A in the inflator 3. Next, the bolts 4B are fixed to the reaction plate 5 with locknuts 6. Thus, the cushion ring 4, the airbag 10, and the inflator 3 are fixed to the reaction plate 5.

The cushion ring 4 and the airbag 10 are attached to one side of the reaction plate 5 having a rectangular peripheral wall. One end of the inflator 3 is inserted into the center opening (not shown) in the reaction plate 5 and, in this state, the inflator 3 is attached to the other surface of the reaction plate 5. The folded airbag 10 is disposed inside the reaction plate 5. The airbag cover 2 is attached to the reaction plate 5 so as to cover the airbag 10. Then, the reaction plate 5 is fixed to the steering wheel 90.

The airbag 10 includes a circular protection fabric piece 13, a belt-like connecting member 14, a reinforcing cover 15, an outer bag 20, and an inner bag 30. The inner bag 30 is disposed inside the outer bag 20, and the connecting member 14 is disposed inside the inner bag 30. The respective parts of the airbag 10 are formed by cutting base fabric, e.g., woven fabric or sheet. The protection fabric piece 13 and the reinforcing cover 15 are disposed at predetermined positions between the cushion ring 4 and the reaction plate 5 and are each provided with the attaching opening 11.

The outer bag 20 and the inner bag 30 constitutes an outer inflatable section and an inner inflatable section of the airbag 10, respectively. The cushion ring 4 is inserted into the inner bag 30 from the attaching opening 11 in the inner bag 30. The outer bag 20 and the inner bag 30 are fixed to the reaction plate 5 by means of the cushion ring 4, and portions around the attaching openings 11 thereof are held between the cushion ring 4 and the reaction plate 5.

Next, the respective parts of the airbag 10 will be described in detail.

Note that, in this embodiment, regarding each of the outer bag 20, the inner bag 30, and the airbag 10, a portion on the occupant side (in FIGS. 2 and 3, upper side), inside the vehicle, is referred to as a front surface, and a portion on the vehicle body side (in FIGS. 2 and 3, lower side), inside the vehicle, is referred to as a rear surface. Regarding the outer bag 20 and the inner bag 30, in a state of being assembled into the airbag 10, a surface on the outer side is referred to as an outer surface, and a surface on the inner side is referred to as an inner surface.

One end of the inflator 3 is disposed inside the inner bag 30. The inner bag 30 has at least one gas exhaust port (gas flow port) (herein, three gas exhaust ports 31 to 33) and an air chamber 34, which is an inside space, and is inflated with the gas supplied from the inflator 3. The first to third exhaust ports 31 to 33 are round holes and allow the gas to circulate between the inside and outside of the inner bag 30. The first exhaust port 31 is provided in the front surface of the inner bag 30, and the second and third exhaust ports 32 and 33 are provided at side portions of the inner bag 30. The inner bag 30 begins to inflate first in the airbag 10 and supplies the gas into the outer bag 20 through the exhaust ports 31 to 33.

The inner bag 30 includes a front base fabric piece (front panel) 35, which constitutes the front surface, and a rear base fabric piece (rear panel) 36, which constitutes the rear surface. The protection fabric piece 13 is attached to the inner surface of the rear base fabric piece 36. The protection fabric piece 13 is disposed between the rear base fabric piece 36 and the cushion ring 4 to protect the rear base fabric piece 36 from the cushion ring 4. The inflator 3 is attached to the attaching opening 11 provided at the center of the rear base fabric piece 36 and to the rear surface of the inner bag 30 and generates gas inside the inner bag 30. The first exhaust port 31 is provided at the center of the front base fabric piece 35 and allows the gas to flow in an occupant direction E from the inner bag 30.

The base fabric pieces 35 and 36 constituting the inner bag 30 are formed of round portions 35A and 36A and at least one rectangular portion (herein, two rectangular portions 35B and 36B). The two rectangular portions 35B and 36B are provided on the outer peripheries of the round portions 35A and 36A so as to extend in the opposite directions from the round portions 35A and 36A. The base fabric pieces 35 and 36 are joined together by sewing or bonding (herein, sewing) along the peripheral portions, and the round portions 35A and 36A and the two rectangular portions 35B and 36B are joined together. The air chamber 34 is formed of the base fabric pieces 35 and 36, inside the inner bag 30.

The inner bag 30 includes a main inflatable section 37, a restriction member 38, and at least one (herein, a pair of) gas discharge tube 40. The main inflatable section 37 is a ball-like inflatable section of the inner bag 30 formed of the round portions 35A and 36A (FIG. 6). The restriction member 38 (FIG. 4) is a belt-like band formed on the front base fabric piece 35 and projects into the first exhaust port 31. As will be described below, the restriction member 38 restricts the inflation of the main inflatable section 37, and hence, restricts the inflation of the inner bag 30, at the beginning of the inflation of the inner bag 30.

The inner bag 30 includes the main inflatable section 37 and the pair of discharge tubes 40. The discharge tubes 40 (FIG. 4) are tubular inflatable sections of the inner bag 30, each of which is formed into a tubular shape from the rectangular portions 35B and 36B. The main inflatable section 37 and the discharge tubes 40 communicate with each other inside. The main inflatable section 37 is inflated in a ball shape, with the gas supplied from the inflator 3, at the center of the inner bag 30. The gas flows from the main inflatable section 37 to the pair of discharge tubes 40, and the discharge tubes 40 are inflated in a tubular shape, with the gas supplied from the main inflatable section 37, toward the outer side of the main inflatable section 37. The inflated main inflatable section 37 and the discharge tubes 40 are deformed and contracted in accordance with the inflation of the airbag 10, which will be described below.

The inner bag 30 has the pair of discharge tubes 40 that project to the sides of the inner bag 30, in the opposite directions, when inflated, and has gas discharge ports 41 provided in the distal ends 42 of the discharge tubes 40. The inner bag 30 discharges the gas generated by the inflator 3 to the outside through the pair of discharge tubes 40, from the inside of the inner bag 30. That is, the discharge tubes 40 discharge the gas to the sides of the inner bag 30 from the discharge ports 41 in the distal ends 42.

The outer bag 20 is a bag member having a circular shape in front view (FIG. 3) and is a main bag accommodating the inner bag 30. When the airbag 10 is inflated, subsequent to the inner bag 30, the outer bag 20 begins to inflate with the gas supplied through the exhaust ports 31 to 33 in the inner bag 30 and is inflated to a larger size than the inner bag 30, around the inner bag 30.

The outer bag 20 includes a front base fabric piece (front panel) 21 constituting the front surface, and a rear base fabric piece (rear panel) 22 constituting the rear surface (FIG. 3). The base fabric pieces 21 and 22 are formed in a circular shape having the same diameter and are joined together along the outer peripheries. The base fabric pieces 21 and 22 form an air chamber 23 (FIG. 2) inside the outer bag 20. The outer bag 20 has at least one (herein, two) vent hole 24 and passing hole 25 through which the discharge tube 40 passes. The vent holes 24 are provided at two locations of the rear base fabric piece 22 and allow the gas to be discharged outside from the inside of the outer bag 20, in a direction where the vehicle body is located (vehicle body direction).

The reinforcing cover 15 that reinforces the rear base fabric piece 22, protects the rear base fabric piece 22 from the gas and heat generated by the inflator 3, and functions as a vent hole cover overlapping the vent holes 24 is attached to the outer surface of the rear base fabric piece 22 of the outer bag 20. The reinforcing cover 15 is a rectangular base fabric, has the attaching opening 11 provided at the center thereof and two circular open holes 15A, and is disposed on the outer surface of the outer bag 20 so as to cover the vent holes 24. Side edges of the reinforcing cover 15 are sewn to the outer surface of the rear base fabric piece 22. The open holes 15A are round holes, like the vent holes 24, and, when the reinforcing cover 15 comes into intimate contact with the rear base fabric piece 22, the open holes 15A overlap the vent holes 24, allowing the gas discharged from the vent holes 24 to pass therethrough.

The two passing holes 25 in the outer bag 20 are slits that are provided in the rear base fabric piece 22, at positions covered by the reinforcing cover 15 on the rear base fabric piece 22. The two passing holes 25 are provided near the two vent holes 24, at the inflator 3 side of the two vent holes 24, and allow the discharge tubes 40 of the inner bag 30 to pass therethrough to the outside or inside of the outer bag 20. The discharge tubes 40 extend from the inner bag 30, pass through the passing holes 25 provided in the outer bag 20, and are disposed on the outside of the outer bag 20. Thus, the distal ends 42 of the discharge tubes 40 are disposed on the outside of the outer bag 20 before the inflation of the airbag 10.

The discharge tubes 40 are disposed on the outside of the outer bag 20, between the reinforcing cover 15 and the outer bag 20 (inside the reinforcing cover 15). The distal ends 42 of the discharge tubes 40 are disposed on the outside of the reinforcing cover 15 through the open ends of the reinforcing cover 15. The pair of discharge tubes 40 are inflated inside the reinforcing cover 15 due to the inflation of the inner bag 30 and discharge the gas inside the inner bag 30 to the outside of the outer bag 20 from the discharge ports 41. The inner bag 30 discharges the gas supplied from the inflator 3 to the outside of the airbag 10 through the pair of discharge tubes 40.

When the airbag 10 is inflated and deployed, the inner bag 30 accommodating the inflator 3 is first inflated inside the outer bag 20, and the outer bag 20 is gradually inflated on the outer side of the inner bag 30. At this time, the inner bag 30 and the outer bag 20, with the rear surfaces thereof, to which the inflator 3 is attached, being connected to each other, deploy to the sides and in the occupant direction E, in front of the occupant. After the entire inner bag 30 has been inflated and deployed, the entire outer bag 20 is inflated and deployed. At this time, the connecting member 14 restricts the inflation and deployment of the outer bag 20, making the outer bag 20 expand to the sides first and then gradually inflate in the occupant direction E. Furthermore, the connecting member 14 controls opening and closing of the discharge tubes 40 (discharge ports 41) and closes the discharge tubes 40 after the inner bag 30 begins to inflate.

The connecting member 14 is a tether belt formed of a strip-like member (herein, a strip-like fabric piece) that is disposed inside the inner bag 30 and the pair of discharge tubes 40. The connecting member 14 connects a predetermined portion located inside the inner bag 30, herein, that is predetermined portions inside the pair of discharge tubes 40, with the inner surface of the outer bag 20. The length of the connecting member 14 is smaller than the length of the base fabric pieces 35 and 36 of the inner bag 30.

By joining ends 14A of the connecting member 14 to the predetermined portions inside the discharge tubes 40, the connecting member 14 is connected to the discharge tubes 40. At the position of the first exhaust port 31, the connecting member 14 is joined to the inner surface (front base fabric piece 21) of the outer bag 20 by sewing, with a circular stitch, which serves as a central connecting portion 14B. The connecting member 14 is connected to the inner surface of the outer bag 20 through the first exhaust port 31 (FIG. 4) in the inner bag 30 and is disposed inside the inner bag 30, between the front base fabric piece 35 and the rear base fabric piece 36, before the inflation of the airbag 10 (FIG. 5).

Figure 4:
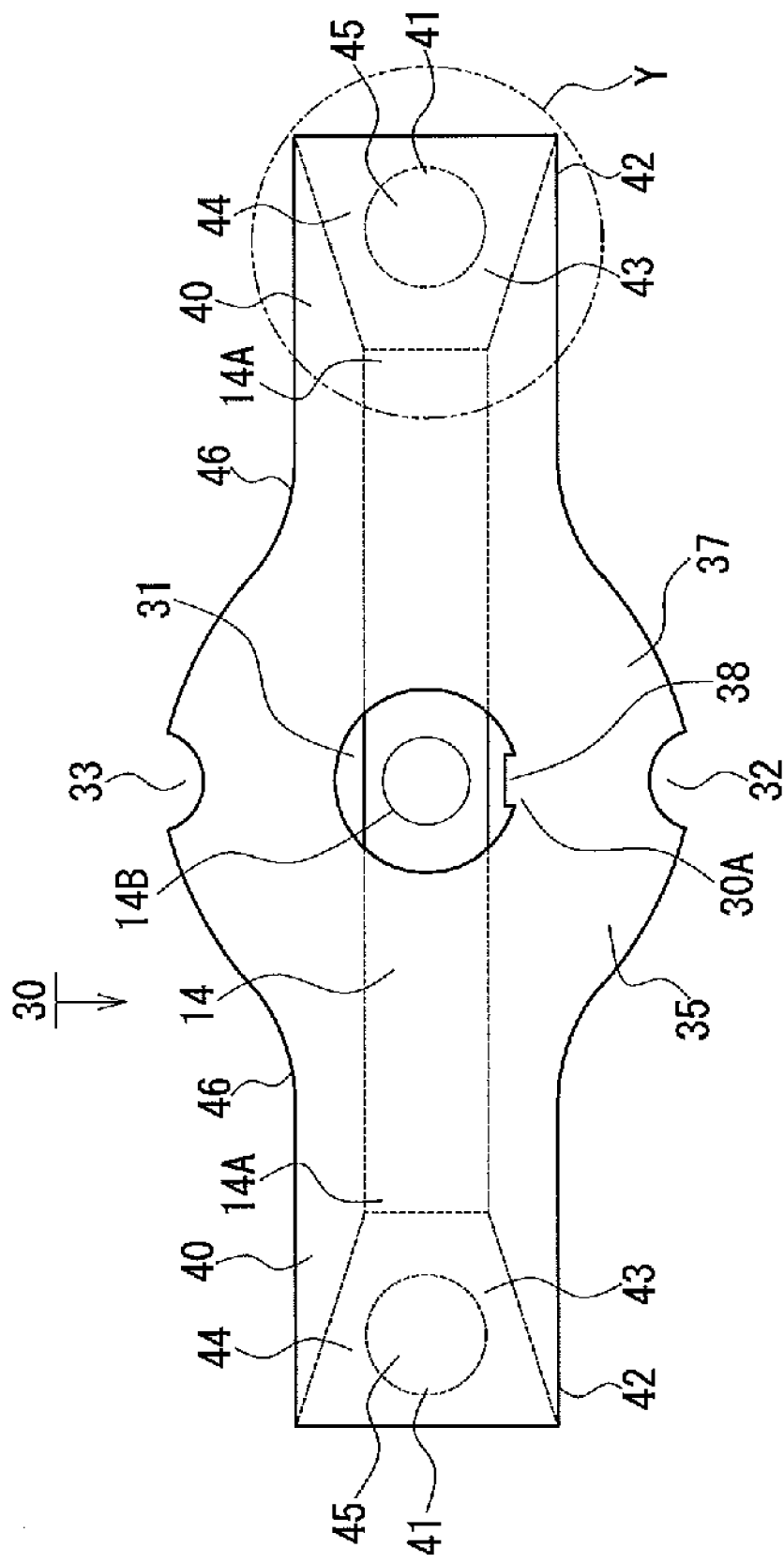
FIG. 4 is a plan view showing an inner bag before inflation.

FIG. 4 is a plan view showing the inner bag 30 before inflation. FIG. 4 shows members inside the inner bag 30 by dashed lines.

As shown in the figure, the pair of discharge tubes 40 each have a folded-back portion 43 and the discharge port 41. The ends of the discharge tubes 40 are folded back into the discharge tubes 40. By doing so, the folded-back portions 43 are formed inside the distal ends 42 of the discharge tubes 40. The discharge ports 41 are provided at the ends of the discharge tubes 40 and are provided in the folded-back portions 43 of the discharge tubes 40. The folded-back portions 43 place the discharge ports 41 inside the discharge tubes 40.

Inside the inner bag 30, the connecting member 14 is disposed between the pair of folded-back portions 43 of the discharge tubes 40, is connected to the ends of the folded-back portions 43 inside the discharge tubes 40, and closes the ends of the folded-back portions 43. The connecting member 14 is disposed linearly and without slack between the pair of folded-back portions 43 and is connected to the inner surface of the outer bag 20 at an intermediate position of the pair of folded-back portions 43. The connecting member 14 extends through the inner bag 30 and connects the folded-back portions 43 inside the pair of discharge tubes 40 to the inner surface of the outer bag 20.

FIG. 5 includes enlarged views of a portion Y of the inner bag 30 shown in FIG. 4. FIG. 5 shows one of the distal ends 42 of the discharge tubes 40. FIG. 5A is a plan view of the discharge tube 40 before the folded-back portion 43 is formed. FIG. 5B is a plan view of the discharge tube 40 after the folded-back portion 43 is formed. FIG. 5C is a cross-sectional view of the discharge tube 40, taken along line Z-Z in FIG. 5B.

As shown in the figures, the base fabric pieces 35 and 36 constituting the inner bag 30 are formed in a trapezoidal shape at the ends of the discharge tubes 40. The entire peripheral portions of the base fabric pieces 35 and 36 (including the trapezoidal portions) are joined together to close the peripheral portions of the discharge tubes 40. Next, the ends of the discharge tubes 40 are reversed into the discharge tubes 40, thereby folding back the ends of the discharge tubes 40. The folded-back portions 43 of the discharge tubes 40 have a tapered shape and are disposed in the discharge tubes 40.

The folded-back portions 43 of the discharge tubes 40 each have a pair of opposing portions (opposing surfaces) 44 that are disposed facing each other in the discharge tube 40. The end of the discharge tube 40 is folded back such that the pair of opposing portions 44 overlap each other. The pair of opposing portions 44 are each formed of the base fabric pieces 35 and 36 of the folded-back portion 43 and are disposed between the base fabric pieces 35 and 36 of the discharge tube 40. The discharge ports 41 are each formed of a pair of through-holes 45 having the same circular shape, provided in the pair of opposing portions 44 so as to pass through the opposing portions 44. The pair of through-holes 45 have the same size and are provided at the same position in the pair of opposing portions 44.

When the end of the discharge tube 40 is folded back at a folding line T, the pair of through-holes 45 are disposed at a predetermined position separated from but adjacent to the folding line T of the discharge tube 40 and overlap each other, together with the pair of opposing portions 44, inside the discharge tube 40. As a result, the pair of through-holes 45 entirely overlap each other inside the discharge tube 40. When the pair of opposing portions 44 are separated from each other at a position near the through-holes 45, the pair of through-holes 45 are partially or entirely separated from each other. This creates a space between the pair of through-holes 45, forming the discharge port 41 in the folded-back portion 43 inside the discharge tube 40. When the inner bag 30 is inflated, the discharge tube 40 discharges the gas only from the discharge port 41.

FIG. 6 is a perspective view of the inner bag 30 after inflation. FIG. 7 includes cross-sectional views showing the distal end 42 of the discharge tube 40. FIG. 7 shows the discharge tube 40 corresponding to FIG. 5C.

As shown in FIG. 6, when the inner bag 30 is inflated, the gas is charged into the air chamber 34 between the base fabric pieces 35 and 36. The inner bag 30 is inflated from a flat shape to a three-dimensional shape.

The pair of discharge tubes 40 are inflated from proximal ends 46 on the main inflatable section 37 side to the distal ends 42. Due to the inflation of the discharge tubes 40, the pair of opposing portions 44 and the pair of through-holes 45 are separated so as to open to the outside of the discharge tubes 40, and the discharge tubes 40 discharge the gas from the discharge ports 41 in the folded-back portions 43 (see FIG. 7A). More specifically, when the inner bag 30 is inflated, the folded-back portions 43 are urged toward the outside of the discharge tubes 40 by the pressure of the gas. Because the pair of folded-back portions 43 pull the connecting member 14 therebetween with equal forces, the connecting member 14 pulls the pair of folded-back portions 43 that are urged toward the outside of the discharge tubes 40. By pulling the folded-back portions 43 toward the proximal ends 46 with the connecting member 14, the folded-back portions 43 and the discharge ports 41 for discharging the gas are held inside the discharge tubes 40, and also the folded-back portions 43 can be prevented from being pushed out of the discharge tubes 40 due to the pressure of the gas.

As the outer bag 20 is inflated, the connecting member 14 is pulled by the outer bag 20 and is gradually drawn out of the inflated inner bag 30. In accordance with this, the connecting member 14 pulls the folded-back portions 43 of the discharge tubes 40 and the discharge ports 41 for discharging the gas. When the connecting member 14 pulls the folded-back portions 43 and the discharge ports 41 toward the inner side of the discharge tubes 40 (toward the proximal ends 46) (see FIG. 7B), the discharge ports 41 gradually become small, reducing the amount of the gas discharged. When the connecting member 14 pulls the folded-back portions 43 further, the pair of opposing portions 44 and the pair of through-holes 45 overlap each other inside the discharge tubes 40, and when the folded-back portions 43 are drawn to a predetermined position inside the discharge tubes 40, the pair of opposing portions 44 overlap each other inside the discharge tubes 40, closing the discharge ports 41 (see FIG. 7C). At this time, the pair of opposing portions 44 surrounding the through-holes 45 are brought into intimate contact with each other due to the pressure of the gas inside the discharge tubes 40, closing the pair of through-holes 45, whereby the discharge tubes 40 stops the discharge of gas from the discharge ports 41.

As has been described above, the connecting member 14 displaces the folded-back portions 43 inside the discharge tubes 40, thereby switching the discharge ports 41 in the discharge tubes 40 between a state of discharging the gas (open state) (see FIG. 7A) and a state of not discharging the gas (closed state) (see FIG. 7C). In a state (see FIG. 7B) immediately after the discharge ports 41 are switched from the open state to the closed state, the gas is discharged from the discharge ports 41, depending on the situation of the airbag 10. Even after the discharge ports 41 are completely closed, when the connecting member 14 is back inside the inner bag 30, the discharge ports 41 are opened again due to the pressure of the gas.

Next, the process of manufacturing the airbag device 1 (see FIG. 3) will be described.

Regarding the outer bag 20, first, the reinforcing cover 15 is sewn to the outer surface of the rear base fabric piece 22 (in FIG. 3, dashed lines show portions to be sewn). Next, the base fabric pieces 21 and 22 are stacked with their outer surfaces facing each other, and the base fabric pieces 21 and 22 are sewn together along the outer peripheries thereof. Then, the base fabric pieces 21 and 22 are turned inside out through the attaching opening 11. Note that FIG. 3 shows the location of the respective members after the outer bag 20 and the inner bag 30 are turned inside out.

Regarding the inner bag 30, first, the protection fabric piece 13 is sewn to the inner surface of the rear base fabric piece 36. Next, the base fabric pieces 35 and 36 are stacked on each other with their outer surfaces facing each other, and the base fabric pieces 35 and 36 are sewn together along the peripheral portions thereof. Furthermore, the ends 14A of the connecting member 14 are joined to the ends of the inner bag 30. Thereafter, the base fabric pieces 35 and 36 are turned inside out through the attaching opening 11, thereby placing the connecting member 14 inside the inner bag 30. The discharge tubes 40 (see FIG. 4) are disposed so as to project outward from the inner bag 30. The ends of the discharge tubes 40 are folded back inside to form the folded-back portions 43 inside the discharge tubes 40.

Next, the cushion ring 4 (see FIG. 3) is inserted into the inner bag 30 from the attaching opening 11, and four bolts 4B of the cushion ring 4 are inserted into the four insertion holes 12 in the inner bag 30. Before the inflator 3 is attached to the inner bag 30, the restriction member 38 of the inner bag 30 is fixed to one of the bolts 4B of the cushion ring 4. In this manner, the restriction member 38 is set to the inner bag 30.

Figure 8A:
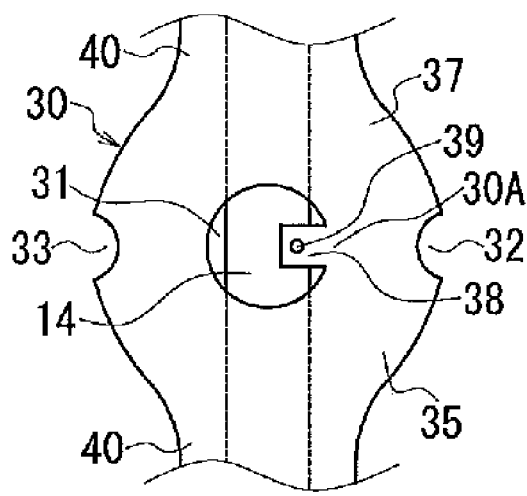
FIG. 8 includes plan views of the inner bag before a restriction member is set.
Figure 8B:
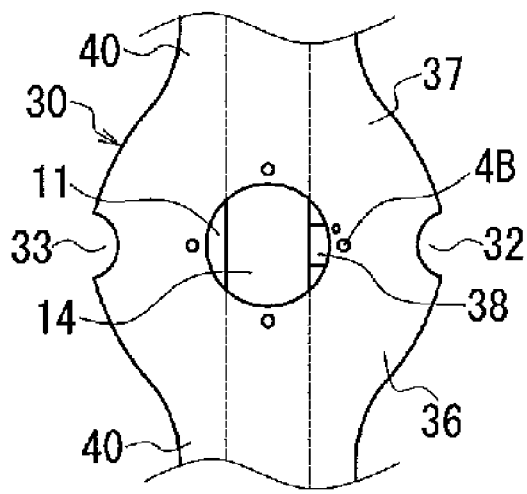
Figure 9A:
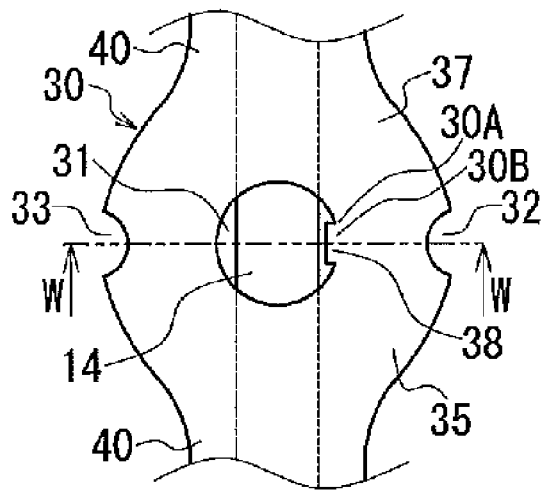
FIG. 9 includes plan views of the inner bag after the restriction member is set.
Figure 9B:
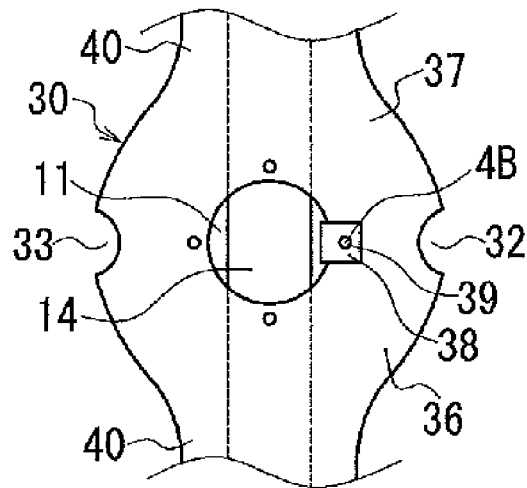
Figure 9C:
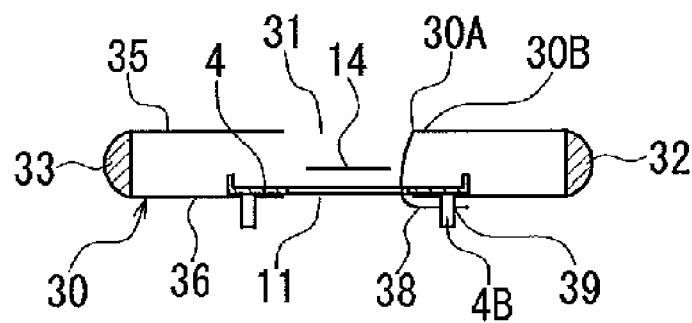

FIG. 8 includes plan views of the inner bag 30 before the restriction member 38 is set. FIG. 9 includes plan views of the inner bag 30 after the restriction member 38 is set. In FIGS. 8 and 9, a portion of the discharge tubes 40 is omitted. FIGS. 8A and 9A are diagrams of the inner bag 30, as viewed from the front base fabric piece 35 side. FIGS. 8B and 9B are diagrams of the inner bag 30, as viewed from the rear base fabric piece 36 side. FIG. 9C is a cross-sectional view of the inner bag 30, taken along line W-W in FIG. 9A.

As shown in FIG. 8, the restriction member 38 is formed on a periphery 30A of the first exhaust port 31 in the inner bag 30. The restriction member 38 is provided at a portion of the periphery 30A and is located inside the first exhaust port 31. The restriction member 38 is provided with a circular attaching hole 39 at an end. The restriction member 38 is attached to the bolt 4B through the first exhaust port 31 and the attaching opening 11. At this time, the restriction member 38 is folded back onto the outer surface of the rear base fabric piece 36, as shown in FIG. 9, and thus, is disposed so as to extend from the front surface to rear surface of the inner bag 30. At the same time, the bolt 4B is inserted into the attaching hole 39 in the restriction member 38, engaging the restriction member 38 with the bolt 4B. One end (distal end) of the restriction member 38 is attached to the bolt 4B via the attaching hole 39.

In this manner, the restriction member 38 is set to the inner bag 30 with the bolt 4B. The front surface and rear surface of the inner bag 30 are connected by the restriction member 38. When the inner bag 30 is inflated, the restriction member 38 pulls a portion of the front surface of the inner bag 30 toward the bolt 4B side. The restriction member 38 restricts the movement of a portion of the front surface of the inner bag 30, restricting the inflation of the portion of the inner bag 30. That is, the restriction member 38 partially restricts the inflation of the inner bag 30.

In this manner, the restriction member 38 connects the opposing portions of the inner bag 30 at a portion (restriction portion 30B) where the inflation of the inner bag 30 is restricted, thereby preventing the opposing portions of the inner bag 30 from being separated and thereby restricting the inflation of the portion of the inner bag 30. More specifically, the restriction member 38 pulls a portion of the periphery 30A of the inner bag 30 and restricts the movement and inflation of the portion of the periphery 30A, causing a portion of the inner bag 30 to inflate to a smaller thickness than the other portion and making the inflation of the inner bag 30 near the first exhaust port 31 irregular.

After the restriction member 38 is set, the inner bag 30 (see FIG. 3) is inserted into the outer bag 20 from the attaching opening 11 in the outer bag 20, and the main inflatable section 37 and the outer bag 20 are disposed concentrically. The inner bag 30 and the outer bag 20 are temporarily joined together with the bolts 4B of the cushion ring 4. In addition, the respective attaching openings 11 and the first exhaust port 31 in the inner bag 30 are aligned. In this state, the connecting portion 14B of the connecting member 14 is sewn to the front base fabric piece 21 of the outer bag 20, at a position inside the attaching opening 11 and the first exhaust port 31. The pair of discharge tubes 40 extend through the passing holes 25 into the reinforcing cover 15, and the distal ends 42 of the discharge tubes 40 are disposed on the outside of the outer bag 20.

Figure 10:
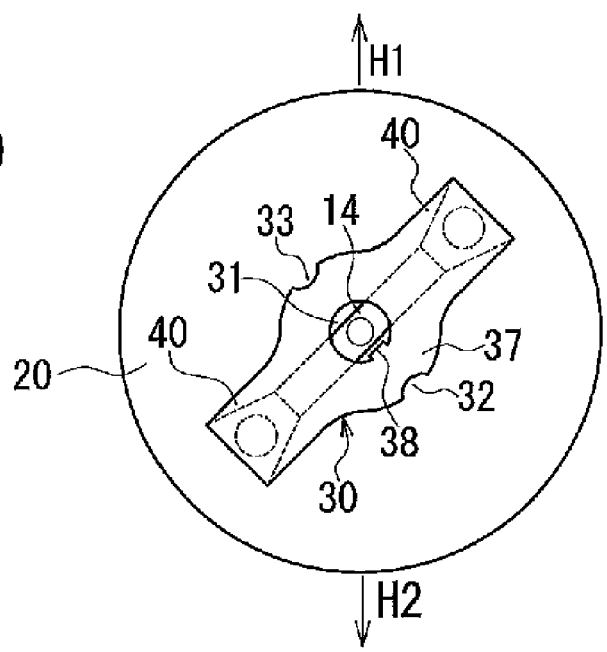
FIG. 10 is a plan view of an outer bag and the inner bag.
Figure 11A:
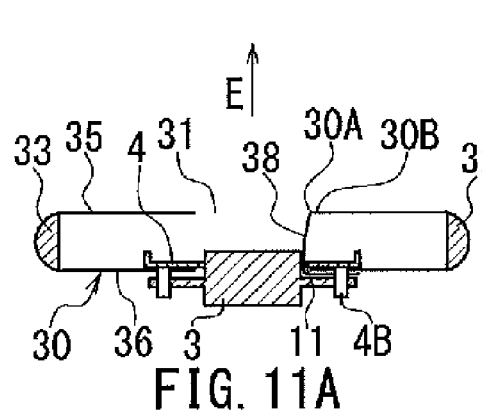
FIG. 11 includes cross-sectional views showing, in stages, the inflating inner bag.
Figure 11B:
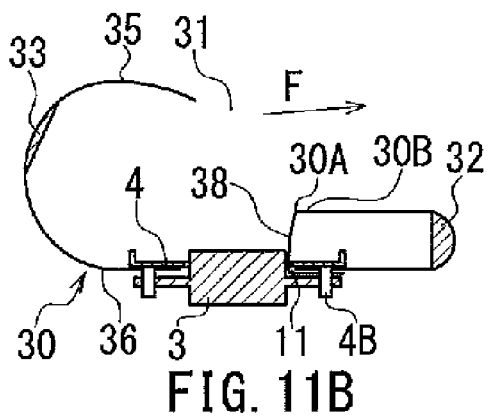
Figure 11C:
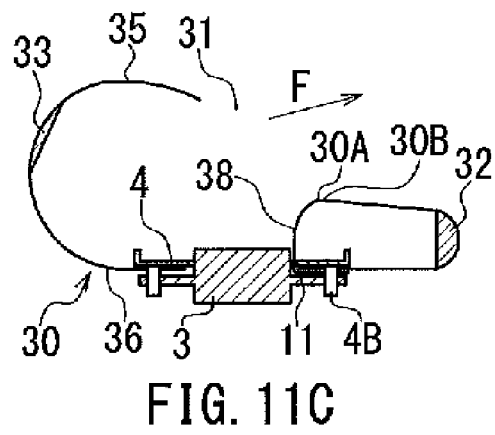
Figure 11D:
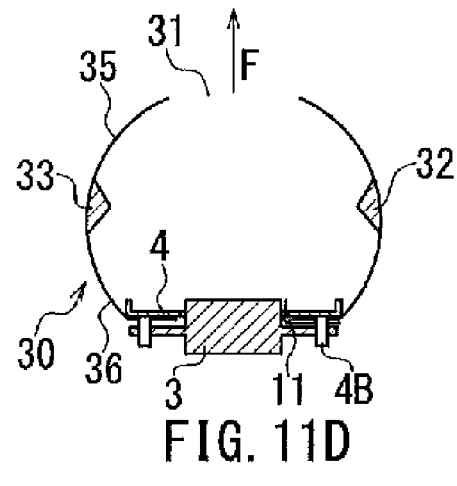
Figure 13A:
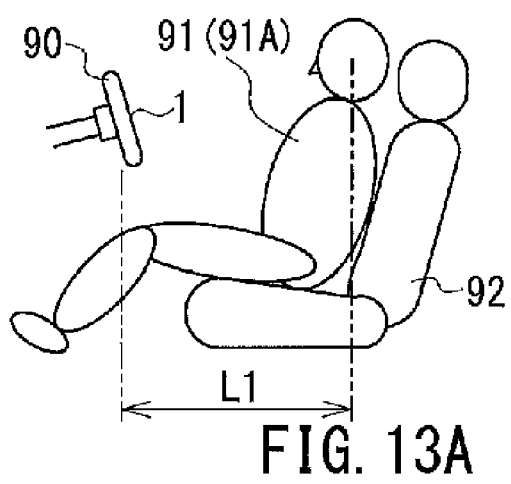
FIG. 13 includes side views showing the airbag device protecting an occupant.
Figure 13B:
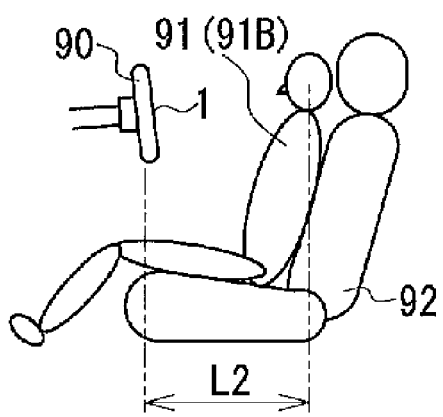
Figure 13C:
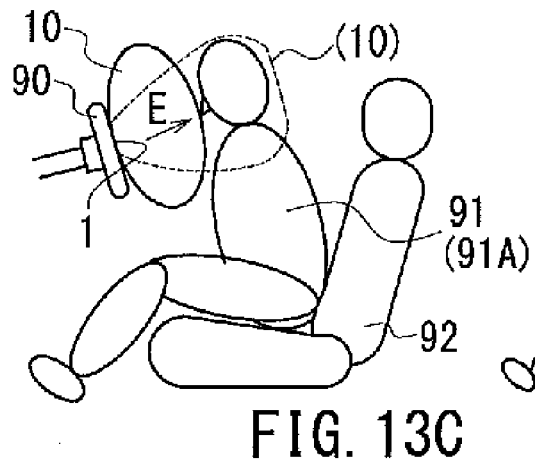
Figure 13D:
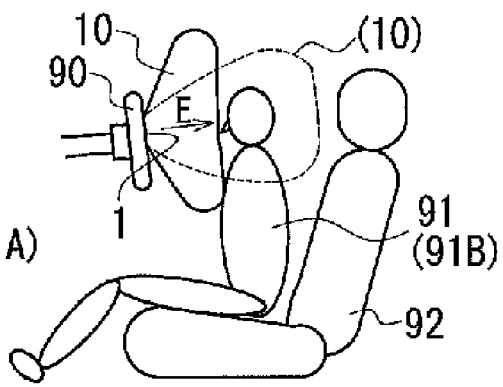

FIG. 10 is a plan view of the outer bag 20 and the inner bag 30, showing the outer bag 20 and the inner bag 30 as viewed from the occupant side. FIG. 10 shows the inner bag 30, as viewed through the outer bag 20. The direction indicated by an arrow H1 in FIG. 10 corresponds to the upper side of the vehicle (occupant's head side) and the direction indicated by an arrow H2 corresponds to the lower side of the vehicle (occupant's foot side).

The inner bag 30 is disposed inside the outer bag 20 so as to be inclined with respect to the top-bottom direction of the vehicle. The pair of discharge tubes 40 are disposed so as to extend obliquely upward and obliquely downward. The restriction member 38 is disposed at the obliquely lower side inside the inner bag 30.

The airbag 10 (see FIG. 3) including the inner bag 30 and the outer bag 20 is attached to the reaction plate 5 with the cushion ring 4, the inflator 3 is attached to the reaction plate 5, and then the locknuts 6 are fastened on the bolts 4B. In this manner, the cushion ring 4, the airbag 10, and the inflator 3 are fixed to the reaction plate 5. Next, the airbag 10 is folded and is placed inside the reaction plate 5. Alternatively, the airbag 10 may be folded in advance before being fixed to the reaction plate 5.

Finally, the airbag cover 2 (not shown in FIG. 3) is attached to the reaction plate 5, thus completing the manufacturing of the airbag device 1. The airbag device 1 is mounted to the steering wheel 90 (see FIG. 1). After that, when the inflator 3 is operated in an emergency of the vehicle or upon detection of an impact, the inflator 3 generates gas, which causes the airbag 10 to unfold, inflate, and deploy so as to cover the steering wheel 90.

FIG. 11 includes cross-sectional views showing, in stages, the inflating inner bag 30. FIG. 11 shows the inner bag 30 in the respective stages, corresponding to FIG. 9C.

At an initial stage of deployment of the airbag 10, first, the inner bag 30 is inflated with the gas supplied from the inflator 3. On the other hand, when the inflator 3 beings to supply the gas, the restriction member 38 restricts the inflation of a portion of the inner bag 30 (the restriction portion 30B).

Due to this, portions other than the restriction portion 30B of the inner bag 30 are inflated to a larger size than the restriction portion 30B. As a result, the inner bag 30 is inflated in such a manner that the front surface (herein, the front base fabric piece 35) and the first exhaust port 31 are inclined (see FIGS. 11A and 11B). Due to the restriction member 38, the direction in which the first exhaust port 31 faces and a gas outflow direction F, in which the gas flows out from the first exhaust port 31, are changed and are inclined with respect to the occupant direction E. In other words, the restriction member 38 shifts the gas outflow direction F from the occupant direction E to another direction by tilting the first exhaust port 31 and the gas outflow direction F, and the inner bag 30 discharges the gas from the first exhaust port 31 in a direction different from the occupant direction E.

The restriction member 38 is attached to the rear surface of the inner bag 30 so as to be in contact with the inflator 3, inside the attaching opening 11 and the cushion ring 4. Therefore, when the restriction member 38 reaches a predetermined temperature due to the heat of the gas generated by the inflator 3, the restriction member 38 breaks due to the heat (see FIGS. 11C and 11D).

When the restriction member 38 breaks during the inflation of the outer bag 20, the restriction member 38 eliminates the restriction of the inflation of the portion of the inner bag 30. This allows the restriction portion 30B of the inner bag 30 to inflate, allowing the entire inner bag 30 to inflate. When the inner bag 30 is inflated to an appropriate shape, the inclination of the front surface of the inner bag 30 and the first exhaust port 31 is eliminated. Thus, the direction in which the first exhaust port 31 faces and the gas outflow direction F are changed to the occupant direction E. The inner bag 30 discharges the gas from the first exhaust port 31 in the occupant direction E, and the airbag 10 is inflated and deployed with the gas supplied from the inner bag 30.

FIG. 12 includes cross-sectional views showing, in stages, the inflation and deployment of the airbag 10. FIG. 12 shows the airbag 10 in the respective stages corresponding to FIG. 2.

At the initial stage of deployment, the inner bag 30 of the airbag 10 is inflated inside the outer bag 20 (see FIG. 12A). At this time, as described above, the restriction member 38 restricts the inflation of a portion of the inner bag 30.

When the occupant is in contact with (or in close vicinity of) the airbag device 1, the occupant comes into contact with the airbag 10 from the first or at an early stage. As in this case, when the occupant is in an OOP (out of position) state, the occupant is received by the inner bag 30 with restricted inflation. Thus, the inner bag 30 absorbs the impact and energy of the occupant without striking the occupant hard. Furthermore, because the gas is not discharged in the occupant direction E from the inner bag 30, the impact applied to the occupant is reduced. As a result, the harmfulness of the airbag 10 to the occupant decreases, and damage to the occupant in an OOP state is suppressed.

When the occupant does not come into contact with the airbag 10 in an early stage, the restriction member 38 breaks at a predetermined timing after the supply of the gas is started. Hence, the entire inner bag 30 is inflated. Because the gas outflow direction F from the inner bag 30 is changed to the occupant direction E, the discharge tubes 40 are inflated from portions inside the outer bag 20 to the distal ends 42 outside the outer bag 20 (see FIG. 12B), in accordance with the inflation of the inner bag 30. The passing holes 25 in the outer bag 20 are expanded by the discharge tubes 40, and the discharge ports 41 in the folded-back portions 43 are also opened inside the discharge tubes 40. The inner bag 30 directly discharges the gas generated by the inflator 3 to the outside of the airbag 10 from the discharge ports 41, thereby suppressing the inflation of the inner bag 30 and the airbag 10.

Because the ends 14A of the connecting member 14 are pulled by the portions located inside the inner bag 30 (herein, the pair of folded-back portions 43 of the discharge tubes 40), the connecting member 14 is held inside the inner bag 30. At the same time, because the pair of folded-back portions 43 are pulled toward the inner side of the discharge tubes 40 by the connecting member 14 and, hence, the folded-back portions 43 and the discharge ports 41 are held inside the discharge tubes 40, the discharge tubes 40 discharge the gas to the outside of the outer bag 20 from the discharge ports 41.

The connecting member 14 applies tension to the inner surface of the outer bag 20 (connecting portion 14B) and pulls the inner surface in the direction opposite to the occupant direction E (i.e., the vehicle body direction), thereby preventing the movement of the front surface of the outer bag 20 and stopping the movement of the front surface in the occupant direction E. That is, the movement of the front surface of the outer bag 20 in the occupant direction E is restricted by the connecting member 14 and the inner bag 30. Furthermore, because the inflation and deployment of the outer bag 20 are restricted due to the tension applied by the connecting member 14, the outer bag 20 first deploys to the sides and then gradually inflates in the occupant direction E. As a result, the outer bag 20 is prevented from inflating or expanding in the occupant direction E, and is inflated to a larger size in the side direction than in the occupant direction E. That is, due to the inflation of the outer bag 20, the central portion of the airbag 10 is inflated to a predetermined thickness without expanding in the occupant direction E.

The outer bag 20 begins to inflate with the gas supplied through the exhaust ports 31 to 33 in the inner bag 30 (FIG. 12 shows only the first exhaust port 31). At this time, because the connecting member 14 restricts the inflation of the outer bag 20 in the occupant direction E, the outer bag 20 is preferentially inflated to the sides. The outer bag 20 is deployed over a wide area so as to extend outward and is uniformly inflated to the sides from the inner bag 30. Next, as the internal pressure of the outer bag 20 increases, the outer bag 20 is inflated in the occupant direction E, increasing the thickness of the outer bag 20.

The inflated inner bag 30 allows the gas to flow out from the exhaust ports 31 to 33 to supply the gas to the entire outer bag 20. This gradually increases the internal pressure of the outer bag 20, reducing the difference in pressure between the inside and outside of the inner bag 30. In accordance with this, the rigidity and ability to keep the inflated shape of the inner bag 30 decrease, the inner bag 30 gradually contracts due to the gas flowing out therefrom, and the decrease in capacity and the decrease in outside diameter progress. In accordance with the inflation of the outer bag 20, the connecting member 14 is pulled by the inner surface of the outer bag 20 in the occupant direction E and is gradually drawn out, in the occupant direction E, from the inflated inner bag 30 through the first exhaust port 31 (see FIG. 12C).

The connecting member 14, while being drawn out of the inner bag 30, gradually moves the front surface of the outer bag 20 in the occupant direction E, drawing the folded-back portions 43 and the discharge ports 41 into the discharge tubes 40. The folded-back portions 43 are gradually drawn deep into the discharge tubes 40 (into the inner bag 30), and the folded-back portions 43 in the vicinity of the discharge ports 41 are brought into intimate contact with each other inside the discharge tubes 40 due to the pressure of the gas, closing the discharge ports 41 in the folded-back portions 43. The connecting member 14 closes the discharge ports 41 for discharging the gas with the folded-back portions 43, thereby stopping the discharge of gas from the discharge ports 41.

The front surface of the outer bag 20 moves in the occupant direction E in response to the amount of the connecting member 14 drawn out, and in accordance with this, the outer bag 20 is gradually inflated in the occupant direction E. The connecting member 14 pulls the folded-back portions 43 of the inflated discharge tubes 40, drawing the discharge tubes 40 into the inner bag 30. The discharge tubes 40 are deformed toward the inside of the inner bag 30, are gradually reversed, and are moved to the outside of the reinforcing cover 15 (into the outer bag 20) by being pulled by the connecting member 14. Next, the discharge tubes 40 are drawn into the outer bag 20 through the passing holes 25 (see FIG. 12D). The discharge tubes 40 move to the outside of the reinforcing cover 15, bringing the reinforcing cover 15 into intimate contact with the rear surface of the outer bag 20. Thus, the passing holes 25 are closed by the reinforcing cover 15. At the same time, the open holes 15A in the reinforcing cover 15 overlap the vent holes 24, allowing the gas inside the outer bag 20 to be discharged to the outside of the outer bag 20 through the vent holes 24 and the open holes 15A.

The connecting member 14 is drawn out of the inner bag 30 while contracting the discharge tubes 40 and the inner bag 30. At this time, because the deformation of the inner bag 30 and the discharge tubes 40 is suppressed due to the inflation force, resistance is applied to the connecting member 14. This resistance is a force that prevents drawing out of the connecting member 14 and is generated by a force that contracts the inner bag 30 and a force that draws in the discharge tubes 40. Thus, stable resistance is applied to the front surface of the outer bag 20 by the connecting member 14 and the inner bag 30, from the initial to final stages of the deployment of the outer bag 20.

Because the resistance applied by the inner bag 30 retards the drawing out of the connecting member 14, the connecting member 14 is gradually drawn out of the inner bag 30. As a result, the connecting member 14 gradually moves the front surface of the outer bag 20 while applying tension to the front surface of the outer bag 20. Because the front surface of the outer bag 20 moves stably, the outer bag 20 is gradually inflated to increase its thickness without causing partial expansion or rapid expansion of the front surface of the outer bag 20. In this manner, the outer bag 20 is stably inflated and deployed.

When the drawing out of the connecting member 14 is stopped, the outer bag 20 is fully inflated and deployed (see FIG. 12E) in front of the occupant. The connecting member 14 and the inner bag 30 are stretched between the front surface and rear surface of the outer bag 20, functioning as a tether belt between the front surface and rear surface of the outer bag 20, and stop the front surface of the outer bag 20. The outer bag 20 is inflated to a predetermined thickness due to the inflation thereof being limited by the connecting member 14 and the inner bag 30, and the front surface thereof is disposed at a predetermined position in front of the occupant.

The airbag device 1 receives and restrains mainly the upper body of the occupant with the airbag 10 in any stage of inflation to protect the occupant. By absorbing the impact and energy with the airbag 10, the impact on the occupant is reduced. When the airbag 10 receives the occupant, the gas inside the outer bag 20 is discharged from the vent holes 24 and the open holes 15A. Thus, the impact on the occupant is reduced.

As has been described above, the airbag device 1 according to this embodiment can reduce the impact on the occupant received by the airbag 10, which impact is applied when the inner bag 30 is inflated inside the outer bag 20. Furthermore, damage to the occupant can be suppressed. After the restriction member 38 breaks, the gas flows out from the inner bag 30 in the occupant direction E. Hence, the properties and deployment behavior of the airbag 10 are not influenced. It is also possible to prevent irregular deployment behavior of the outer bag 20.

Because the restriction member 38 breaks due to the heat of the inflator 3, the restriction member 38 can be reliably broken. The restriction member 38 may be broken at a predetermined timing in order to reduce the variation in breaking of the restriction member 38. By attaching one end of the restriction member 38 to the bolt 4B, the restriction member 38 can be easily set to the inner bag 30. Because the first exhaust port 31 (the gas outflow direction F) is inclined using the restriction member 38, the gas outflow direction F can be precisely shifted from the occupant direction E to another direction. When the inflation of the periphery 30A of the inner bag 30 is restricted with the restriction member 38, the first exhaust port 31 and the gas outflow direction F can be appropriately inclined.

The airbag 10 is prevented from expanding toward the occupant, and the airbag 10 is stably inflated and deployed. Because the airbag 10 can be prevented from striking the occupant hard, the impact applied to the occupant can be reduced. Even when the occupant is in close vicinity of the steering wheel 90, the impact applied to the occupant can be significantly reduced. When the connecting member 14 draws in the inflated discharge tubes 40, the discharge tubes 40 apply large resistance to the connecting member 14. As a result, the connecting member 14 reliably and firmly restricts the movement of the front surface of the outer bag 20.

Because partial expansion of the airbag 10 is suppressed, the front surface of the airbag 10 moves in a relatively flat state. Therefore, the occupant can be received by a wide surface of the airbag 1 and can be safely restrained. Because the airbag 10 is gradually inflated in the occupant direction E, the airbag 10 is prevented from expanding and contracting in the thickness direction after completion of the inflation. As a result, bouncing of the airbag 10 is reduced. Because the inflated shape of the airbag 10 and the position of the front surface thereof are stabilized in an early stage, the performance of the airbag 10 becomes stable. The airbag 10 can safely restrain the occupant even immediately after the inflation and deployment. Because an effective absorbing stroke can be secured in the airbag 10 when the occupant comes into contact with the airbag 10, the impact and energy of the occupant can be reliably absorbed.

Owing to the connecting member 14 and the inner bag 30 functioning as a tether belt, the airbag 10 is inflated and deployed to predetermined thickness and shape, and the fluctuation of the airbag 10 after inflation and deployment is suppressed. Furthermore, because the inflation of the airbag 10 in the occupant direction E can be restricted, the safety of the airbag 10 for the occupant can be improved. When only the inner bag 30 is utilized as the tether belt without providing the connecting member 14, the size of the inner bag 30 needs to be increased to ensure the thickness of the airbag 10. However, in this embodiment, by providing the connecting member 14, the airbag 10 can be inflated to a necessary thickness with a small inner bag 30.

With the airbag 10 that is inflated in the above-described manner, the occupant can be safely protected. Furthermore, because the airbag 10 can still cope with the difference in the state of the occupant seated in the driver's seat after the restriction member 38 breaks, occupants in any state can be protected.

FIG. 13 includes side views showing the airbag device 1 protecting an occupant. FIG. 13 shows two occupants 91 (91A and 91B) with different body sizes.

When the large occupant 91A (see FIG. 13A) is seated in a driver's seat 92, the occupant 91A positions the driver's seat 92 on the rear side of the vehicle. Hence, the distance L1 between the occupant 91A and the airbag device 1 is large.

When the small occupant 91B (see FIG. 13B) is seated in the driver's seat 92, the occupant 91B positions the driver's seat 92 on the front side of the vehicle. Hence, the distance L2 between the occupant 91B and the airbag device 1 is small. Accordingly, the small occupant 91B comes into contact with the airbag 10 at an earlier timing than the large occupant 91A does.

With this embodiment, when the airbag 10 is inflated, dangerous expansion (indicated by dashed lines in FIGS. 13C and 13D) of the airbag 10 is prevented. The airbag 10 is gradually inflated in the occupant direction E in such a manner that the front surface of the airbag 10 is maintained flat. Therefore, the occupants 91A and 91B are appropriately received by the airbag 10 without being damaged due to expansion of the airbag 10. The large occupant 91A (see FIG. 13C) comes into contact with and is protected by the airbag 10 that has properly inflated and deployed.

The small occupant 91B (see FIG. 13D) comes into contact with and is protected by the airbag 10 that is in the middle of inflation and deployment. The small occupant 91B comes into contact with the airbag 10 that is flat yet sufficiently inflated. Thus, the small occupant 91B is safely protected by the airbag 10. In this manner, regardless of the state of the occupants 91A and 91B, the airbag 10 can protect the occupants 91A and 91B without damaging them. Because this airbag 10 provides high performance of restraining the occupants 91A and 91B, in particular, high initial restraint performance, the occupants 91A and 91B can be safely restrained.

The outer bag 20 is quickly inflated to the sides and is deployed over a wide area in a short time. Therefore, even when the occupant 91 advances into the airbag 10 at high speed, the occupant 91 can be reliably received by the airbag 10. When the occupant 91 is in intimate contact with the steering wheel 90, the outer bag 20 is inflated to the sides from a small space between the occupant 91 and the steering wheel 90 that is created by the inflation of the inner bag 30. As a result, the airbag 10 deploys between the occupant 91 and the steering wheel 90, and the occupant 91 is protected by the airbag 10. Even when the occupant 91 advances into the airbag 10 that is in the middle of deployment, the inner bag 30 prevents the occupant 91 from coming into contact with the steering wheel 90.

Even when the occupant 91 is in the OOP state, the occupant 91 in an off-normal seating position can be protected by the airbag 10. More specifically, when the occupant 91 comes into contact with the airbag 10, the gas supplied from the inflator 3 is discharged to the outside of the outer bag 20 from the discharge ports 41 in the discharge tubes 40 (see FIG. 12B). Because of this, the inflation of the airbag 10 in the occupant direction E is suppressed, and the energy supplied to the airbag 10 decreases. Accordingly, the impact on the occupant 91 exerted by the airbag 10 is more effectively reduced.

The gas supplied from the inflator 3 is efficiently discharged at a high rate through the discharge tubes 40. Therefore, a large amount of gas can be discharged from the discharge ports 41 in a short time. Even when the discharge ports 41 are small, a sufficient amount of gas discharge can be ensured. As a result, it is possible to suppress damage to the occupant 91 in the OOP state. When the occupant 91 is not in the OOP state, the discharge ports 41 are closed in accordance with the inflation of the outer bag 20. Because the discharge of gas is stopped, the amount of the gas supplied to the outer bag 20 increases, and thus, the occupant 91 is protected by the outer bag 20 that has been inflated and deployed to a large size.

While the gas is discharged from the discharge ports 41, the folded-back portions 43 and the discharge ports 41 are held inside the discharge tubes 40 by the connecting member 14 (see FIG. 7). The connecting member 14 draws the folded-back portions 43 into the discharge tubes 40, causing the folded-back portions 43 to close the discharge ports 41. Because the discharge ports 41 can be closed by displacing the folded-back portions 43 inside the discharge tubes 40, the displacement distance required for the folded-back portions 43 to close the discharge ports 41 is small. As a result, the time needed to stop the discharge of gas can be reduced. The response of the mechanism for closing the discharge ports 41 also improves. In particular, compared with discharge tubes having no folded-back portions 43, the time needed to stop the discharge of gas is significantly reduced.

While the gas is discharged to the outside of the airbag 10 to suppress the inflation of the airbag 10 at the beginning of the inflation of the airbag 10, the discharge of gas can be stopped in a short time. As a result, the gas can be effectively utilized. When the occupant 91 is not in the OOP state, the internal pressure of the outer bag 20 can be quickly increased. By closing the discharge ports 41, the resistance applied from the folded-back portions 43 to the connecting member 14 increases, restricting the movement of the front surface of the outer bag 20 from an early stage. Folding back the ends of the discharge tubes 40 also contributes to a reduction in the overall length of the inner bag 30.

When the occupant 91 is received by the airbag 10 that is inflated to some extent, the gas is discharged from the discharge ports 41 depending on the necessity (see FIG. 7B). Thus, the impact on the occupant 91 is reduced. The occupant 91 may advance into the airbag 10 (see FIG. 12C) while the folded-back portions 43 are drawn into the discharge tubes 40. At this time, the connecting member 14 is returned into the inner bag 30. The folded-back portions 43 are pushed by the gas, opening the closed discharge ports 41. The airbag 10 discharges the gas from the discharge ports 41 that are opened again, thereby absorbing the impact and energy of the occupant 91.

When the connecting member 14 is connected to the pair of folded-back portions 43 of the discharge tubes 40, the pair of folded-back portions 43 can be pulled by the one connecting member 14. The connecting member 14 between the pair of folded-back portions 43 can evenly pull the pair of folded-back portions 43. Because the pair of folded-back portions 43 both pull the connecting member 14, the position of the pair of folded-back portions 43 inside the discharge tubes 40 is stabilized.

The thickness of the airbag 10 at the initial stage of deployment can be set by the thickness of the inflated inner bag 30. By reducing the thickness of the airbag 10 at the initial stage of deployment depending on the distance between the occupant 91 and the airbag device 1, a risk to the occupant 91 can be avoided. Then, the connecting member 14 is drawn out of the inner bag 30, and the outer bag 20 is fully inflated. The airbag 10 exhibits the maximum absorbing stroke for the occupant 91. When the airbag 10 is inflated and deployed, the inner bag 30 is inflated first. Next, the outer bag 20 is inflated to the sides and is then fully inflated. During this time, the airbag 10 is gradually inflated while maintaining sufficient internal pressure. Hence, the occupant 91 can be safely restrained by the airbag 10.

Note that, in this embodiment, although the description has been given by taking the airbag device 1 for the driver's seat as an example, the present invention may be applied to an airbag device for a passenger's seat or to another airbag device. The restriction member 38 may be joined to the inner bag 30 without using the bolts 4B. Both ends of the restriction member 38 may be joined to the front surface and rear surface inside the inner bag 30. The restriction member 38 may be provided at a position other than the periphery 30A of the inner bag 30. Furthermore, the restriction member 38 may be broken by the gas generated by the inflator 3. In such a case, the restriction member 38 is provided at a position close to the inflator 3 so as to be subjected to the gas. The restriction member 38 is burnt by the heat of the gas or broken by the pressure of the gas. Alternatively, the restriction member 38 may be broken by the pressure of the gas for inflating the inner bag 30. The restriction member 38 may be provided with a weakened portion (for example, perforation) to facilitate breaking.

The connecting member 14 (see FIG. 3) may be a member other than the strip-like member (for example, a cord or a ribbon). The connecting member 14 may be connected to the outer bag 20, not through the first exhaust port 31, but through another opening in the inner bag 30. Note that, however, when the connecting member 14 is connected to the outer bag 20 through the first exhaust port 31, the effort and man-hours required to provide another opening are unnecessary.

The discharge tubes 40 may be disposed on the outside of the outer bag 20 through the vent holes 24. When the vent holes 24 are used as passing holes for the discharge tubes 40, the passing holes 25 do not have to be formed in the outer bag 20. Therefore, the effort and man-hours required to provide the passing holes 25 are eliminated. The distal ends 42 of the discharge tubes 40 may be disposed between the reinforcing cover 15 and the outer bag 20. The number of discharge tubes 40 provided in the inner bag 30 may be one, or three or more. The main inflatable section 37 of the inner bag 30 may be formed in any shape (for example, a ball shape, an ellipsoidal shape, or a pyramid shape).

REFERENCE SIGNS LIST

1: airbag device, 2: airbag cover, 3: inflator, 4: cushion ring, 5: reaction plate, 6: locknut, 10: airbag, 11: attaching opening, 12: insertion hole, 13: protection fabric piece, 14: connecting member, 15: reinforcing cover, 20: outer bag, 21: front base fabric, 22: rear base fabric, 23: air chamber, 24: vent hole, 25: passing hole, 30: inner bag, 31 to 33: gas exhaust port, 34: air chamber, 35: front base fabric, 36: rear base fabric, 37: main inflatable section, 38: restriction member, 39: attaching hole, 40: discharge tube, 41: discharge port, 42: distal end, 43: folded-back portion, 44: opposing portions, 45: through-hole, 46: proximal ends, 90: steering wheel, 91: occupant, and 92: driver's seat.

The invention claimed is:

1. An airbag device for protecting an occupant of a vehicle, the airbag device comprising:
   an inflator that supplies gas;
   an inner bag that is inflated with the gas supplied from the inflator;
   a gas exhaust port that is formed on the inner bag and allows the gas to flow out from the inner bag in an occupant direction;
   an outer bag that accommodates the inner bag and is inflated with the gas supplied from the gas exhaust port; and
   a restriction member that restricts the inflation of a portion of the inner bag to change a direction of which the gas flows out from the gas exhaust port to avoid the occupant direction and that breaks during the inflation of the outer bag to release the restriction of the inflation of the inner bag,
   wherein the restriction member comprises a band that connects opposing portions of the inner bag, inside a portion of the inner bag.

2. An airbag device for protecting an occupant of a vehicle, the airbag device comprising:
   an inflator that supplies gas;
   an inner bag that is inflated with the gas supplied from the inflator;
   a gas exhaust port that is formed on the inner bag and allows the gas to flow out from the inner bag in an occupant direction;
   an outer bag that accommodates the inner bag and is inflated with the gas supplied from the gas exhaust port; and
   a restriction member that restricts the inflation of a portion of the inner bag to change a direction of which the gas flows out from the gas exhaust port to avoid the occupant direction and that breaks during the inflation of the outer bag to release the restriction of the inflation of the inner bag,
   wherein the inflator is attached to the inner bag and generates gas inside the inner bag, and
   the restriction member is disposed adjacent to the inflator inside the inner bag and breaks due to the heat of the inflator that generates gas or due to the gas generated by the inflator.

3. The airbag device according to claim 2, further comprising an attaching member with which the inflator is attached to the inner bag, wherein one end of the restriction member is attached to the attaching member.

4. An airbag device for protecting an occupant of a vehicle, the airbag device comprising:
   an inflator that supplies gas;
   an inner bag that is inflated with the gas supplied from the inflator;
   a gas exhaust port that is formed on the inner bag and allows the gas to flow out from the inner bag in an occupant direction;
   an outer bag that accommodates the inner bag and is inflated with the gas supplied from the gas exhaust port; and
   a restriction member that restricts the inflation of a portion of the inner bag to change a direction of which the gas flows out from the gas exhaust port to avoid the occupant direction and that breaks during the inflation of the outer bag to release the restriction of the inflation of the inner bag,
   wherein said airbag further comprises a connecting member that is disposed inside the inner bag and connects an inside portion of the inner bag to an inner surface of the outer bag, wherein the connecting member is drawn out of the inflated inner bag in accordance with the inflation of the outer bag, moving a front surface of the outer bag in the occupant direction.

5. The airbag device according to claim 4, wherein the connecting member is connected to the inner surface of the outer bag through the gas exhaust port in the inner bag.

* * * * *